United States Patent [19]

Takahashi

[11] 4,151,449
[45] Apr. 24, 1979

[54] POSITIONING CONTROL APPARATUS

[76] Inventor: Shuichi Takahashi, 1-1-16, Takaidohigashi, Suginamiku, Tokyo, Japan

[21] Appl. No.: 873,435

[22] Filed: Jan. 30, 1978

[51] Int. Cl.$^2$ ............................................. G05B 19/40
[52] U.S. Cl. ...................... 318/138; 318/696
[58] Field of Search ................ 318/696, 685, 138, 227

[56] References Cited

U.S. PATENT DOCUMENTS

| 3,842,332 | 10/1974 | Heine et al. | 318/696 |
| 3,866,104 | 2/1975 | Heine | 318/696 |

*Primary Examiner*—B. Dobeck
*Attorney, Agent, or Firm*—Spensley, Horn, Jubas & Lubitz

[57] ABSTRACT

A digital code representing a reference angular position $\phi$ of a polyphase synchronous motor is stored in a register. Each one current-controllable power supply is provided for each phase of the motor, and each power supply is controlled by the contents of the register and maintain the current supplied to the corresponding phase of the motor at a value proportional to $\cos\{\phi-(k-1)2\pi/N\}$, where N is the total number of phases of the motor and k is the sequential order (1, 2, 3, ... N) of a phase concerned. A resultant magnetic field is produced in a direction corresponding to the reference angular position $\phi$, and the rotor of the motor stops at the direction of the resultant field. When the contents of the register is changed, the angular position of the rotor follows the change of the contents of the register.

4 Claims, 3 Drawing Figures

POSITIONING CONTROL APPARATUS

BACKGROUND OF THE INVENTION

This invention relates to a control apparatus for a synchronous motor, and more particularly to a positioning control apparatus for a synchronous motor.

A positioning control apparatus for a synchronous motor is disclosed in detail by a U.S. Pat. No. 4,051,419, entitled "CONTROL SYSTEM OF AN ALTERNATING-CURRENT MOTOR" owned by the same applicant of the present invention. But the positioning control apparatus for a synchronous motor disclosed by the U.S. Pat. No. 4,051,419 belongs to a closed-loop control system in which the feedback signal is obtained from the instantaneous angular position of the rotor of the motor under control. For some applications, however, an open-loop positioning control system is more desirable, and a stepping motor or a so-called pulse motor has exclusively been used in the heretofore known open-loop positioning control system.

As is well known, a stepping motor has several disadvantages. One disadvantage of a stepping motor is that the motor experiences a vibratory transient at each input pulse, since the motor is rotated by such a large amount of an electrical angle as 180° for each input pulse.

Another disadvantage of a stepping motor is that the motor has not a sufficiently large torque to retain an angular position when the input pulse to the motor is in a quiescent state.

Still another disadvantage is that the heretofore known stepping motor control system lacks the capability of recovering a lost step when the motor failed, by some mischance, to move a step for an input pulse.

It is, therefore, a principal object of the present invention to provide a control apparatus whereby an open-loop positioning control is attained by a synchronous motor and whereby all the demerits which are inherent to a stepping motor are eliminated.

A further object of the invention is to provide a control apparatus, whereby the respective magnitudes of the currents flowing in the stator windings of a snychronous motor are controlled in such a way as the resultant magnetic field generated by these currents (hereafter will be called a stator magnetic field) is in a direction corresponding to the reference angular position $\phi$, at which the rotor of the snychronous motor is positioned.

Another object of the invention is to provide a control apparatus in which the respective magnitudes of the currents flowing in the stator windings of a synchronous motor are controlled by chopping a constant d. c. voltage and regulating the current flow angles in proportion to the respective reference magnitudes of the currents.

A further object of the present invention is to provide a control apparatus in which the respective reference magnitudes of the currents in the stator windings of a synchronous motor are obtained from a reference angular position $\phi$.

Another object of the present invention is to provide a control apparatus in which a digital code representing a reference angular position $\phi$ of a synchronous motor under control is stored in a pulse counter as an integrated value of the number of input pulses to the counter.

These and other objects of the present invention will become manifest upon a study of the following description and the accompanying drawings.

SUMMARY OF THE INVENTION

In one illustrative embodiment of the present invention, there is provided an up-down counter which stores a digital code representing a reference angular position $\phi$ of a polyphase synchronous motor under control. One pulse input to the counter increases (or decreases) a unit increment $\Delta\phi$ of the reference angular position $\phi$.

A read-only-memory means (hereafter will be called a ROM) stores cosine data codes representing the magnitude and the sign of $\cos\{\phi-(K-1)2\pi/N\}$, where N is the total number of phases of the polyphase synchronous motor, k is the sequential order (1, 2, 3, ... N) of a phase concerned, and $\phi$ is the address of the memory stored. The ROM is addressed by the contents of the up-down counter, and the output of the ROM controls a corresponding gate generator to generate a gate pulse having a width proportional to the cosine data in a predetermined repetition period.

Each one chopper circuit is connected between a constant d. c. power supply and each phase of the polyphase stator windings of the motor, and is controlled by the corresponding gate pulse to allow the current flow from the power supply in the time interval of the gate pulse width, the direction of the current flow being controlled by the sign bit of the cosine data codes. Because of a smoothing circuit having a large inductance of the phase winding, the current flowing in the phase winding is a direct current and the magnitude of the current is proportional to the current flow angle of the chopper.

Thus, the currents in all the stator windings will be respectively proportional to $\cos\phi$, $\cos(\phi-2\pi/N)$, $\cos(\phi-2.2\pi/N)$, ... $\cos\{\phi-(k-1)2\pi/N\}$, ... $\cos\{\phi-(N-1)2\pi/N\}$, and it will be obvious that these currents produce a stator magnetic field in a direction corresponding to the reference angular position $\phi$.

The rotor of a synchronous motor may be considered as a magnetic bar rotatable in the stator magnetic field and therefore, the rotor has a stable standstill point corresponding to the direction of the stator magnetic field. When the angular position of the rotor differs by a difference angle $\theta$ from this stable standstill point, a torque T is exerted to the rotor in the direction to reduce the difference angle $\theta$. In a range where $\theta$ is not large, this torque T is nearly proportional to the difference angle $\theta$ and will be represented by an equation $T = -C\theta$ where C is a proportional constant.

Thus, the transition of the difference angle $\theta$ is represented by an equation $$J(d^2\theta/dt^2) + F(d\theta/dt) + C\theta = 0 \qquad (1)$$

where J and F are respectively the inertia and the friction coefficient of the rotor (including the load coupled to the rotor).

The rotor experiences a transient in accordance with equation (1), and comes to the stable standstill point where $\theta = 0$. And the rotor is retained at this standstill point by the stator magnetic field against external disturbances as long as the direction of the stator magnetic field is not changed.

When the reference angular position is changed, the currents in the stator windings are changed to produce a stator magnetic field in the direction of the changed angular position $\phi$, and the angular position of the rotor follows the changed direction of the stator magnetic field. Thus, an open-loop positioning control is attained by a synchronous motor.

The magnitude of the transient of the difference angle $\theta$ is determined by the initial value of the angle $\theta$. As the initial value of the difference angle $\theta$ is equal to a unit increment $\Delta\phi$ of the reference angular position $\phi$ in a running state of the synchronous motor, the initial value of the difference angle $\theta$ can be made as small as desired to reduce the magnitude of the transient to a negligibly small quantity.

BRIEF DESCRIPTION OF THE DRAWINGS

Reference will now be made to the accompanying drawings in which.

DESCRIPTION OF THE INVENTION

Figure 1:
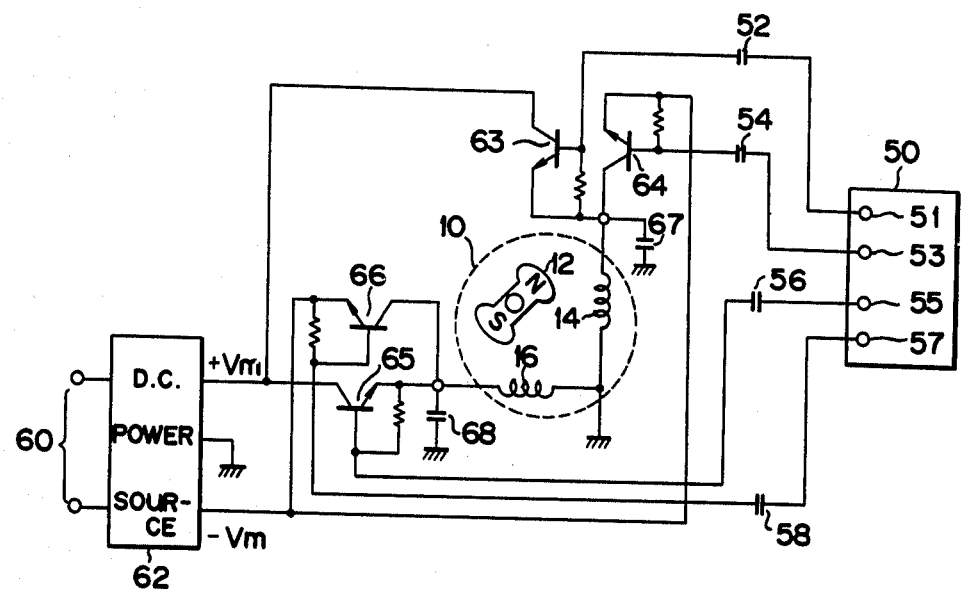
FIG. 1 is a circuit diagram illustrating an embodiment of this invention.

Referring now to FIG. 1, a polyphase synchronous motor 10 has a rotor 12, a first phase (k=1) stator winding 14, and a second phase (k=2) staror winding 16. In the embodiment shown in FIG. 1, the rotor 12 is a permanent magnet rotor and has a single pair of magnetic poles as shown by N and S in the diagram. The stator windings 14 and 16 are spaced at right angles to each other. The stator magnetic field will be in a direction $\phi$ (measured from the direction of the magnetic field produced by the first phase stator winding 14) when the currents in the windings 14 and 16 are respectively proportional to $\cos\phi$ and $\cos(\phi-2\pi/4)$.

A synchronous motor which has two stator windings spaced at right angles to each other, is generally called a two phase motor, but the synchronous motor 10 may be considered as a four phase (N=4) motor in which the third phase (k=3) stator winding is united with the first phase stator winding 14 and the fourth phase (k=4) stator winding is united with the second phase stator winding, since the thid phase winding is in a reversed direction to the first phase winding and the fourth phase winding is in a reversed direction to the second phase winding in a four phase synchronous motor.

A d.c. power source 62 receives a commercial frequency power supply from terminals 60 and generates a positive d.c. voltage $+V_m$ and a negative d.c. voltage $-V_m$ of a same magnitude. Transistor chopper circuits 63, 64, 65, and 66 are connected between the power source 62 and the stator windings 14 and 16. Capacitors 67 and 68 are connected in parallel to the windings 14 and 16 respectively.

A chopper control circuit 50 has four output terminals 51, 53, 55, and 57 from which respective gate pulses are transmitted. The transistor 63 is controlled by the gate pulse from the terminal 51 through a capacitor 52, the transistor 64 is controlled by the gate pulse from the terminal 53 through a capacitor 54, the transistor 65 is controlled by the gate pulse from the terminal 55 through a capacitor 56, and the transistor 66 is controlled by the gate pulse from the terminal 57 through a capacitor 58.

Figure 2:
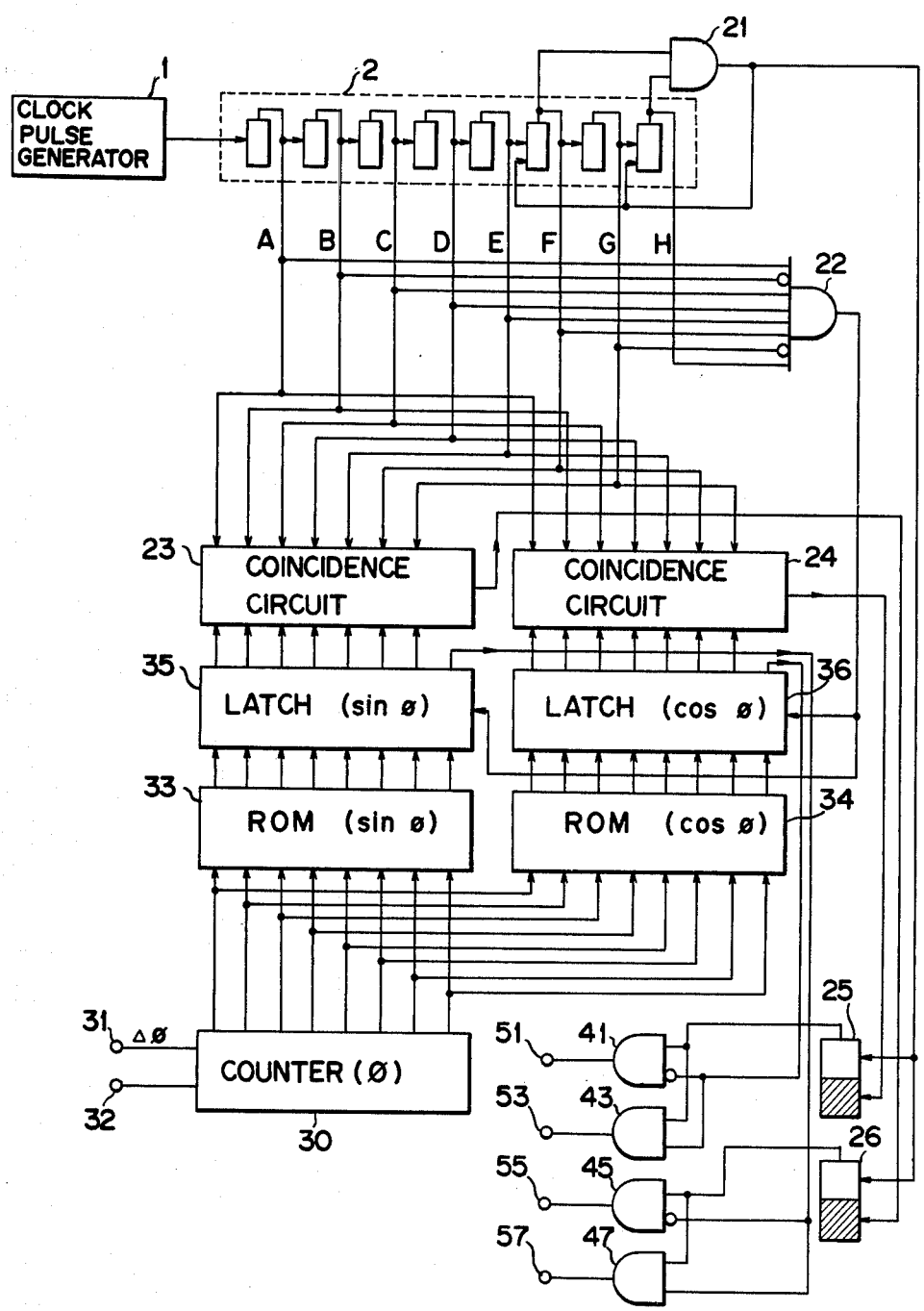
FIG. 2 is a block diagram of an embodiment of the chopper control circuit shown in FIG. 1.

Referring now to FIG. 2, there is shown a block diagram of an embodiment of the chopper control circuit 50. A register 30 stores an angle data code representing a reference electrical position angle $\phi$, and in this embodiment, the register 30 is an up-down counter 30 which has a pulse input terminal 31 and an up-down control signal input terminal 32. (The reset terminal of the counter 30 is not shown in the drawing.) For a numerical example, it is assumed that the unit increment $\Delta\phi$ corresponding to one pulse input is $2\pi/2^8$ and that the counter 30 is an eight bit binary counter.

A read-only-memory (ROM) 33 stores a cosine data code for $\cos(\phi-2\pi/4) = \sin\phi$, while another ROM 34 stores another cosine data code for $\cos\phi$ at respective addresses corresponding to $\phi$. It is assumed that these cosine data codes are composed of each one bit representing the sign of the corresponding cosine data and each 7 bits representing the magnitude of the cosine data. The ROM 33 and the ROM 34 are addressed by the contents of the counter 30, and these cosine data codes are readout. The output of the ROM 33 is transferred to a latch 35 and the output of the ROM 34 is transferred to a latch 36. An AND gate 22 determines the time phase of this transfer in such a way as the transfer does not take place during the time when the output of the latch 35 (or 36) is being compared by a coincidence circuit 23 (or 24).

A clock pulse generator 1 generates a clock pulse of a sufficiently high frequency, and a pulse counter 2 counts this clock pulse. In this embodiment, the counter 2 is an eight bit binary counter which is reset at a 160th count phase through an AND gate 21. Set-reset type flipflops 25 and 26 are set by the output pulse from the gate 21.

A coincidence circuit 23 detects the coincidence between the lower 7 bits of the output of the counter 2 (as shown by A, B, C, D, E, F, G, in FIG. 2) and the corresponding output of the latch 35 which represents the magnitude of $\sin\phi$. When the coincidence is detected, a pulse is transmitted from the coincidence circuit 23 to the reset terminal of the flipflop 26.

Another coincidence circuit 24 detects the coincidence between the lower 7 bits of the output of the counter 2 and the corresponding output of the latch 36 which represents the magnitude of $\cos\phi$. When the coincidence is detected, a pulse is transmitted from the coincidence circuit 24 to the reset terminal of the flipflop 25.

Figure 3:
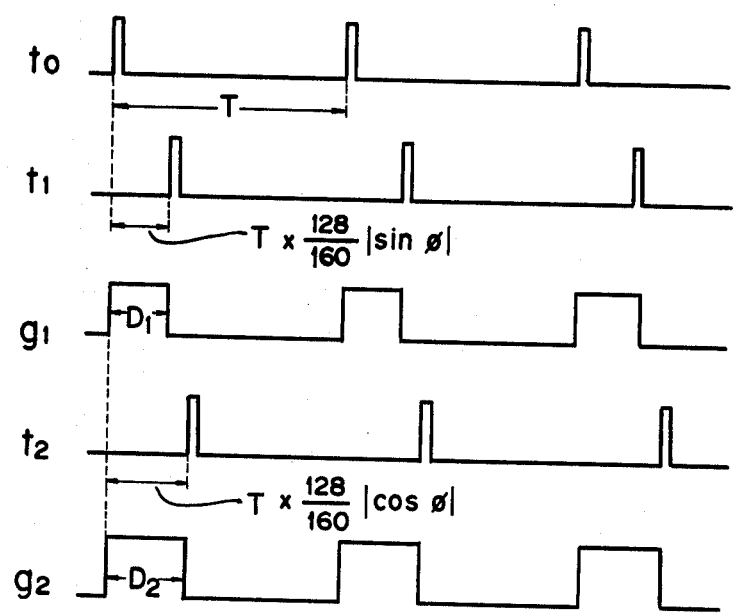
FIG. 3 is a performance time chart illustrating an example of the performance of the chopper control circuit shown in FIG. 2.

Referring now to FIG. 3, in which a performance time chart of the chopper control circuit of FIG. 2 is illustrated, $t_o$ shows the output pulse from the gate 21, and the repetition period T of this output pulse is equal to 160 cycles of the clock pulse, since the counter 2 is reset at each 160 cycles of the clock pulse as described in the foregoing paragraph. The output pulses from the coincidence circuits 23 and 24 are shown by pulses $t_1$ and $t_2$ respectively.

The time delay between $t_o$ and $t_1$ is equal to T $\times$ (128/160)$|\sin\phi|$, since the counter 2 advances a count phase in T/160 and the output of the latch 35 is a 7 bit binary code in which the magnitude of $\sin\phi$ corresponds to $128|\sin\phi|$ counts of the counter 2. Similarly, the time delay between $t_o$ and $t_2$ is equal to T $\times$ (128/160)$|\cos\phi|$.

Therefore, the output of the flipflop 26 becomes a gate pulse as shown by $g_1$ of FIG. 3, and the output of the flipflop 25 becomes a gate pulse as shown by $g_2$ of FIG. 3. An AND gate 41 transmits the gate pulse $g_2$ from the flipflop 25 to the terminal 51 when the sign bit from the latch 36 is at a logic "LOW" level which means $\cos\phi \geq 0$, while an AND gate 43 transmits the gate pulse $g_2$ to the terminal 53 when the sign bit from the latch 36 is at a logic "HIGH" level which means $\cos\phi<0$. An AND gate 45 transmits the gate pulse $g_1$ from the output of the flipflop 26 to the terminal 55 when the sign bit from the latch 35 is at a logic "LOW" level which means $\sin\phi\geqq0$, while an AND gate 47 transmits the gate pulse $g_1$ to the terminal 57 when the sign bit from the latch 35 is at a logic "HIGH" level which means $\sin\phi<0$.

The transistor 63 connects the positive voltage power source $+V_m$ to the winding 14 for the duration of the gate pulse $g_2$ when the gate pulse $g_2$ is transmitted to the terminal 51, the transistor 64 connects the negative voltage power source $-V_m$ to the winding 14 for the duration of the gate pulse $g_2$ when the gate pulse $g_2$ is transmitted to the terminal 53, the transistor 65 connects the positive voltage power source $+V_m$ to the winding 16 for the duration of the gate pulse $g_1$ when the gate pulse $g_1$ is transmitted to the terminal 55, and the transistor 66 connects the negative voltage power source $-V_m$ to the winding 16 for the duration of the gate pulse $g_1$ when the gate pulse $g_1$ is transmitted to the terminal 57.

The magnitudes of the currents in the windings 14 and 16 can not be changed abruptly because of the smoothing circuits composed of the inductance of these coils and the capacitance of the capacitors 67 and 68, and therefore, the average magnitudes of the currents in these coils become proportional to the current flow angles of the corresponding chopper circuits. Thus, the average current in the winding 14 becomes proportional to $\cos\phi$ and the average current in the winding 16 becomes proportional to $\sin\phi$. It is obvious that these stator currents produce a stator magnetic field in the direction of the reference angular position $\phi$, and the rotor 12 stops at an angular position which corresponds to the reference angular position $\phi$.

The contents of the counter 30 representing a reference angular position $\phi$, is changed by input pulses from the terminal 31, each one input pulse corresponding to a unit increment $\Delta\phi$ of the reference angular position $\phi$, and the position of the rotor 12 follows the change of the reference angular position $\phi$. Thus an angular position of an object (not shown in the drawing) coupled to the rotor axis of the synchronous motor 10 is controlled in an open-loop control system.

Although the invention has been described in a preferred embodiment with a certain degree of particularity, it is to be understood that the invention is not limited by a particular embodiment described.

In the embodiment shown by FIG. 1, it is assumed that the synchronous motor 10 has a single pair of poles, and therefore, the electrical position angle of the synchronous motor 10 is equal to the mechanical position angle of the motor 10. When a synchronous motor having Z pairs of poles is to be positioned at a mechanical angular position $\phi_o$, an angle data code representing a reference electrical position angle $\phi=Z\phi_o$ is to be stored in the register 30.

And, in the embodiment shown by FIG. 1, it is assumed that N=4. But it is clear that the present invention is generally applicable to a polyphase synchronous motor where $N\geqq3$. For a N-phase synchronous motor, the respective magnitudes of the currents in the stator windings are to be proportional to $\cos\phi$, $\cos(\phi-2\pi/N)$, .... $\cos\{\phi-(k-1)2\pi/N\}$, .... $\cos\{\phi-(N-1)2\pi/N\}$ in order to generate a stator magnetic field in the direction $\phi$. This proportionality among the current magnitudes can be obtained by controlling the current in each phase winding of the N-phase stator windings through the respective chopper circuit and the associated chopper control circuit in a similar way as shown in FIG. 1 and FIG. 2.

In the embodiment shown in FIG. 1, a common d.c. power source 62 and each one clipper circuit for each phase winding are employed for controlling the stator currents. But it is obvious that any type of a heretofore known controllable power supply can be used for controlling the stator currents, and the reference signals for controlling the stator currents can be obtained from the cosine data codes which are read-out from the memory means ROM 33 and ROM 34.

In the embodiment shown in FIG. 2, the register for storing the angle data code is an up-down counter 30, and the contents of the counter 30 is changed by a unit increment $\Delta\phi$ at a time by an input pulse to the counter 30. But the register for storing the angle data code may be, for example, an accumulator to which any desired number M corresponding to an angle $M\Delta\phi$ can be added (or subtracted) at a time.

And, in the embodiment shown by FIG. 2, read-only-memory means are employed as a data processing means for generating cosine data codes from the angle data code. But it is apparent that any type of a heretofore known data processing means can be employed for generating cosine data codes from the angle data code.

I claim:

1. A positioning control apparatus comprising:
   a polyphase synchronous motor;
   a register means for storing an angle data code representing a reference electrical position angle $\phi$ for the rotor of said motor;
   a data processing means connected to the output of said register means for receiving the contents of said register means and generating cosine data codes respectively representing $\cos\phi$, $\cos(\phi-2\pi/N)$, .... $\cos\{\phi-(k-1)2\pi/N\}$, .... $\cos\{\phi-(N-1)2\pi/N\}$ where N being the total number of phases of said polyphase synchronous motor, and k being the sequential order of a phase concerned; and
   each one controllable power supply for each phase winding of the polyphase stator windings of said motor, said controllable power supply receiving the cosine data code for the phase concerned from said data processing means and controlling the current in said phase winding to maintain said current at a value proportional to said cosine data represented by said received cosine data code.

2. A positioning control apparatus according to claim 1, wherein said each one controllable power supply for each phase winding comprises a chopper circuit connected between a constant voltage power source and said phase winding, said chopper circuit controlling the current flow duration from said constant voltage power source at a value corresponding to the cosine data represented by said received cosine data code.

3. A positioning control apparatus according to claim 1, wherein said register means comprises a counter which counts the number of input pulses, an input pulse corresponding to a unit increment of said reference electrical position angle.

4. A positioning control apparatus according to claim 1, wherein said data processing means comprises memory means for storing said cosine data codes which are read-out by said angle data code transmitted from said register means.

* * * * *